United States Patent
Armstrong

(10) Patent No.: US 9,697,352 B1
(45) Date of Patent: Jul. 4, 2017

(54) INCIDENT RESPONSE MANAGEMENT SYSTEM AND METHOD

(71) Applicant: Logically Secure Limited, Cheltenham, Gloucestershire (GB)

(72) Inventor: Stephen Armstrong, Cheltenham (GB)

(73) Assignee: LOGICALLY SECURE LIMITED, Cheltenham, Gloucestershire (GB)

(*) Notice: Subject to any disclaimer, the term of this patent is extended or adjusted under 35 U.S.C. 154(b) by 188 days.

(21) Appl. No.: 14/614,679

(22) Filed: Feb. 5, 2015

(51) Int. Cl.
| | |
|---|---|
| *G06F 11/00* | (2006.01) |
| *G06F 21/50* | (2013.01) |
| *G06F 21/57* | (2013.01) |
| *H04L 29/06* | (2006.01) |

(52) U.S. Cl.
CPC .............. *G06F 21/50* (2013.01); *G06F 21/57* (2013.01); *H04L 63/20* (2013.01); *G06F 2221/034* (2013.01)

(58) Field of Classification Search
CPC .... G06F 21/50; G06F 21/57; G06F 2221/034; H04L 63/20
USPC .......................................................... 726/22
See application file for complete search history.

(56) References Cited

U.S. PATENT DOCUMENTS

2015/0294244 A1* 10/2015 Bade .................... G06Q 10/063
　　　　　　　　　　　　　　　　　　　　　705/7.11
2015/0365438 A1* 12/2015 Carver ................ H04L 63/1441
　　　　　　　　　　　　　　　　　　　　　726/1

* cited by examiner

*Primary Examiner* — Baotran N To
(74) *Attorney, Agent, or Firm* — King & Schickli, PLLC

(57) ABSTRACT

A computer-implemented incident response management system, and corresponding method in which an incident response application is provided having a user interface; at least one central processing unit; an operating system and a database communicably coupled to said incident response application. The incident response application is configured to: receive, via said user interface, notification of a cyber or information security incident, together with data objects representative of entities related to said incident, files and/or data found during said incident, and/or observed actions and/or outcomes related to said incident; provide, via said user interface, an interactive representation of said incident, including information represented by said data objects, to selected users; receive, in the form of one or more Indicators of Compromise, data related to the detection of system compromise in connection with one or more of said data objects; and store said Indicators of Compromise in connection with a respective incident.

18 Claims, 8 Drawing Sheets

INCIDENT RESPONSE MANAGEMENT SYSTEM AND METHOD

FIELD OF THE INVENTION

This invention relates generally to an incident response management system and method.

BACKGROUND TO THE INVENTION

Information Security incidents are complex activities that can involve multiple departments, individuals and disciplines across geographically dispersed locations. Tackling computer related attacks can be an equally complex activity that requires multiple individuals to collaborate in a secure environment away from the observation of attackers.

The identification of malicious activity will often require staff to access, review, collate and process evidence from multiple sources. They will need to collaborate with system administrators, legal advisors, and senior management in a secure manner. This presents coordination, tracking, monitoring, and evidence integrity issues. In addition, the incidents are increasingly dynamic and fast flowing and rely upon the collection and preservation of digital evidence to correctly deal with the issues in a timely manner.

Without suitable planning, coordination, and management, effort can be wasted, evidence lost or compromised, and staff (especially executives and managers) can feel disconnected from the purpose of digital and cyber defence activity.

SUMMARY OF THE INVENTION

In accordance with an aspect of the present invention, there is provided a computer-implemented incident response management system, comprising:

an incident response application providing a user interface;
at least one central processing unit;
an operating system;
a database communicably coupled to said incident response application;
wherein said incident response application is configured to:
receive, via said user interface, notification of a cyber or information security incident, together with data objects representative of entities related to said incident, files and/or data found during said incident, and/or observed actions and/or outcomes related to said incident;
provide, via said user interface, an interactive representation of said incident, including information represented by said data objects, to selected users;
receive, in the form of one or more Indicators of Compromise, data related to the detection of system compromise in connection with one or more of said data objects; and
store said Indicators of Compromise in connection with a respective incident.

The incident response application may be configured to receive said Indicators of Compromise as one or more user inputs and/or as imported files or internet feeds. The incident response application may be configured to compare said Indicators of Compromise against data stored in connection with said incident, or other stored incidents, and generate an alert if a match is identified.

A system according to an exemplary embodiment of the invention may be configured to allow a user to schedule periodic comparisons of Indicators of Compromise against data stored in connection with a plurality of stored incidents, and generate an alert in the event that a match is identified.

A system according to an exemplary embodiment may be configured to associate one or more of said data objects with one or more selected users, and generate or retrieve and output a workflow in relation to said one or more data objects for performance by said one or more users. The workflow may include an indication of timescales within which steps of said workflow should be performed, and a function for recording the times at which said steps are performed. The workflow may include an indication of the required characteristics of the user to perform the steps thereof.

A system according to an exemplary embodiment may comprise a virtual machine hosting environment configured to generate a virtual machine based on selected data objects of an incident, provide a user interface for said virtual machine for enabling a user to interact therewith, generate evidence data representative of outcomes resulting from user interaction with said virtual machine, and storing said evidence data in connection with said incident.

A system according to an exemplary embodiment may be configured to allow access to data relating to an incident to be accessed only by authorised personnel and/or from authorised IP addresses. The system may include a reporting function for generating a report including data related to said incident, data relating to workflow steps planned and performed, projected workflow timescales, and any additional user-generated data relevant to said incident.

In accordance with another aspect of the present invention, there is provided a method of providing an incident response management system, the system comprising:

an incident response application providing a user interface;
at least one central processing unit;
an operating system;
a database communicably coupled to said incident response application;
the method comprising configuring said incident response application to:
receive, via said user interface, notification of a cyber or information security incident, together with data objects representative of entities related to said incident, files and/or data found during said incident, and/or observed actions and/or outcomes related to said incident;
provide, via said user interface, an interactive representation of said incident, including information represented by said data objects, to selected users;
receive, in the form of one or more Indicators of Compromise, data related to the detection of system compromise in connection with one or more of said data objects; and
store said Indicators of Compromise in connection with a respective incident.

A method according to an exemplary embodiment of the invention may include the step of configuring said incident response application to receive said Indicators of Compromise as one or more user inputs and/or as imported files or internet feeds. The method may alternatively or in addition include the step of configuring said incident response application to compare said Indicators of Compromise against data stored in connection with said incident, or other stored incidents, and generate an alert if a match is identified. In this case, the method may include the step of configuring the system to allow a user to schedule periodic comparisons of Indicators of Compromise against data stored in connection with a plurality of stored incidents, and generate an alert in the event that a match is identified.

A method according to an exemplary embodiment of the invention may include the step of configuring the system to associate one or more of said data objects with one or more selected users, and generate or retrieve and output a workflow in relation to said one or more data objects for performance by said one or more users. The workflow may include an indication of timescales within which steps of said workflow should be performed, and a function for recording the times at which said steps are performed. The workflow may include an indication of the required characteristics of the user to perform the steps thereof.

In a method according to an exemplary embodiment of the invention, the incident response management system may comprise a virtual machine hosting environment, and the method includes the steps of configuring said virtual machine hosting environment to generate a virtual machine based on selected data objects of an incident, provide a user interface for said virtual machine for enabling a user to interact therewith, generate evidence data representative of outcomes resulting from user interaction with said virtual machine, and storing said evidence data in connection with said incident.

A method according to an exemplary embodiment of the invention may include the step of configuring the system to allow access to data relating to an incident to be accessed only by authorised personnel and/or from authorised IP addresses. The method may further include configuring a reporting function for generating a report including data related to said incident, data relating to workflow steps planned and performed, projected workflow timescales, and any additional user-generated data relevant to said incident.

In accordance with yet another aspect of the invention, there is provided a method of incident response management, comprising providing a system as described above, entering, via said user interface, notification of a cyber or information security incident, together with data objects representative of entities related to said incident, files and/or data found during said incident, and/or observed actions and/or outcomes related to said incident; providing, via said user interface, an interactive representation of said incident, including information represented by said data objects, to selected users; entering, in the form of one or more Indicators of Compromise, data related to the detection of system compromise in connection with one or more of said data objects; and causing the system to store said Indicators of Compromise in connection with a respective incident.

These and other aspects of the present invention will become apparent from the following description of an exemplary embodiment.

DETAILED DESCRIPTION

As stated above, tackling computer related attacks can be a complex activity that requires multiple individuals to collaborate in a secure environment away from the observation of attackers. The identification of malicious activity will often require staff to access, review, collate and process evidence from multiple sources. They will need to collaborate with system administrators, legal advisors, and senior management in a secure manner. An Incident Response (IR) application according to an exemplary embodiment of the present invention is designed to provide a secure location where these individuals can store evidence, collate intelligence on attackers and events, communicate IR progress and IR planning activities. The proposed application will, in-the-background, process uploaded files and evidence, cross check it against known Indicators of Compromise (IoC) and provide the incident teams with a place to analyse the evidence in a virtual representation of a real system. The application described herein, by way of example only, will process uploaded data in a variety of methods including full text searches and cross check aspects of the data against known attack profiles, IoCs, user-defined fields and externally supplied intelligence feeds.

Figure 1:
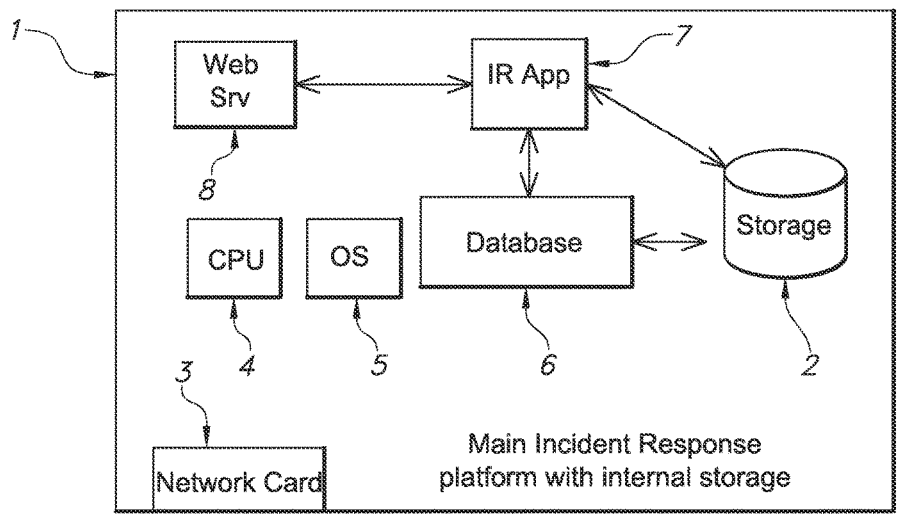
FIG. 1 is a schematic block diagram of an incident response system according to an exemplary embodiment of the present invention.

Referring to FIG. 1 of the drawings, an IR platform [1] according to an exemplary embodiment of the invention, is comprised of standard computer storage [2], IP network connection interfaces [3] and one or more CPUs [4]. Onto this an Operating System (OS) is installed [5]. A database [6] is installed onto the OS [5] along with the IR application [7] and an industry standard web server [8]. Collectively, this will be referred to herein as the IR platform.

Figure 2:
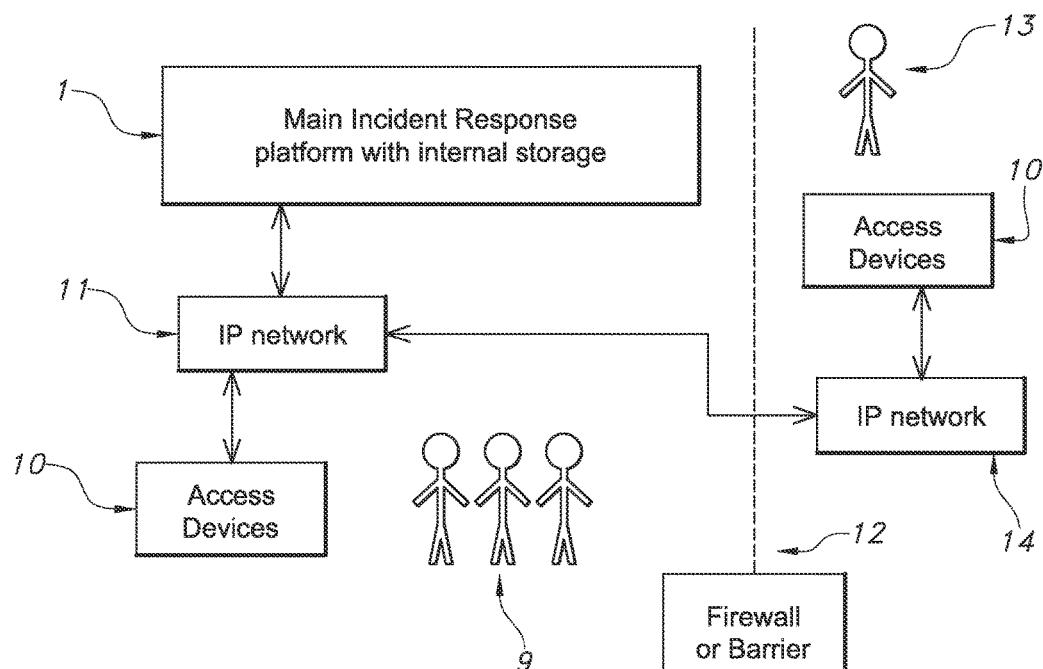
FIG. 2 is a schematic diagram illustrating the manner in which an incident response platform according to an exemplary embodiment of the present invention can be accessed.

Referring additionally to FIG. 2 of the drawings, the platform [1] is accessed by the internal users [9] by means of standard IP (Internet Protocol) and web browser equipped devices [10] (e.g. MS Windows, Apple Mac OSx, most Linux OSs and most mobile computing platforms including IP enabled browser capable tablets and phones) via an IP network using appropriate IP infrastructure [11]. The system can be accessed internally or, with suitable firewall or security barrier [12] configuration; it can be accessed by authorised external users [13] using similar access devices [10] via a connected external IP based network [14].

Figure 3:
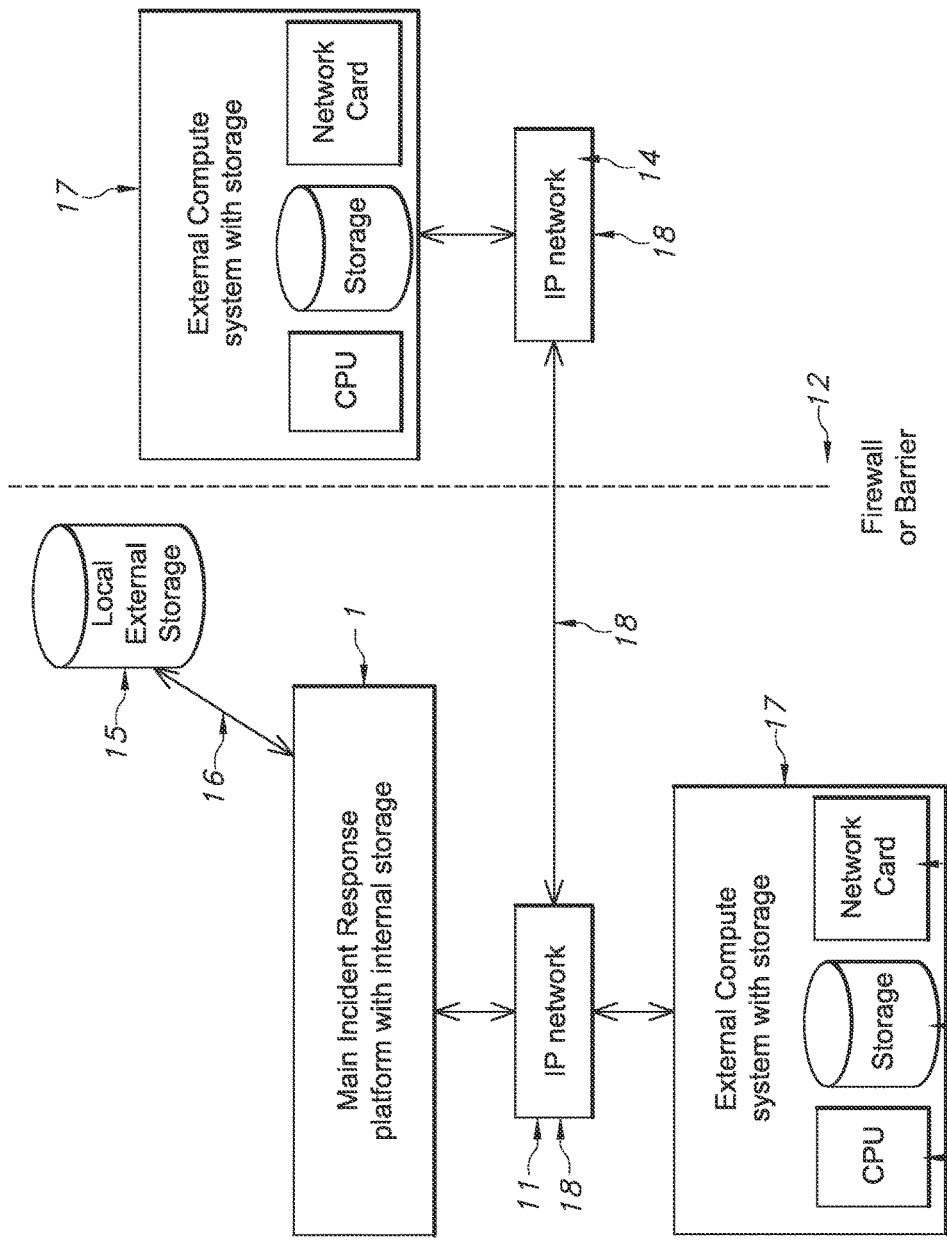
FIG. 3 is a schematic diagram illustrating the manner and configuration in which an incident response platform is connected to, and communicates with, local and external storage devices.

Referring additionally to FIG. 3 of the drawings, the platform's [1] performance can be improved with additional, local external storage devices [15] that are connected by industry standard methods [16] e.g. eSATA (external SATA), SAN (Storage Area Network), NAS (Network Attached Storage), USB/USB3 or Thunderbolt connectors. Furthermore, it can be connected via the IP infrastructure [11] to additional compute and storage systems [17] by means of secured communications protocols [18] e.g. ssh (Secure shell), VPN (Virtual Private Network) or HTTPS, enabling additional CPU [4] and storage [2] to be provided to the main application [7]. The system can also be augmented with additional compute and storage capability by means of the same secure IP connectivity [18] to external or cloud based services following appropriate configuration of the secure IP protocols [18] and the configuration of the firewall or security barriers [12].

User Accounts and Levels

Figure 4:
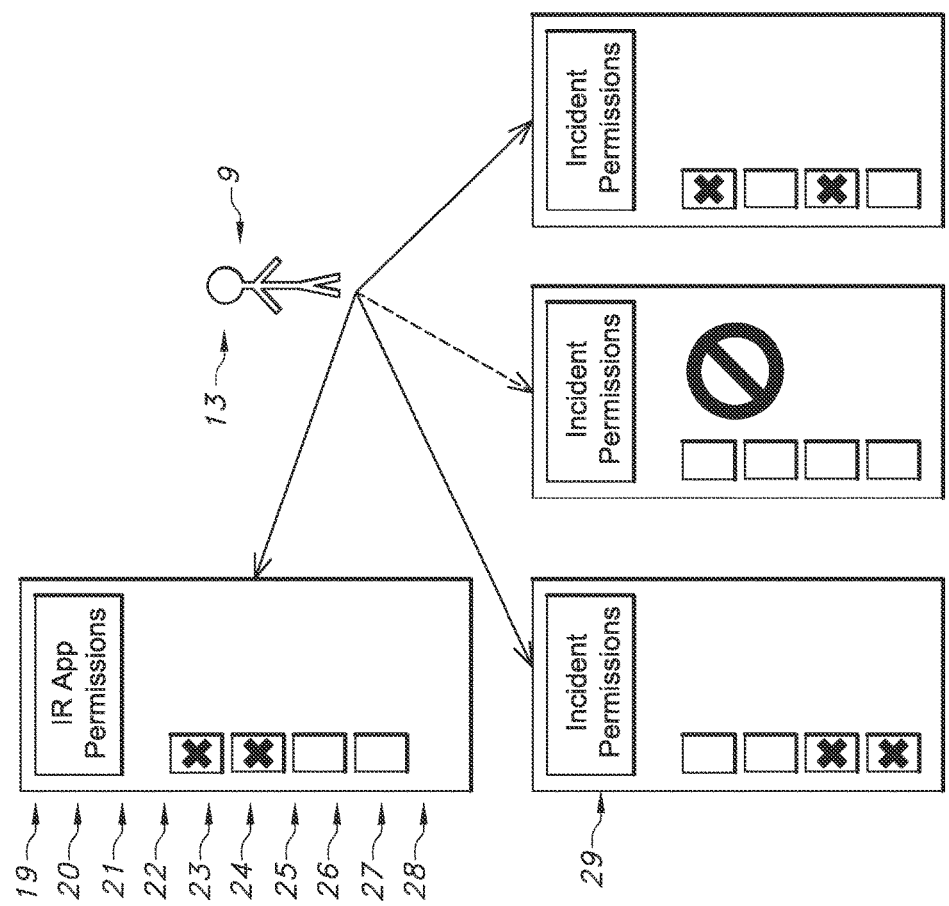
FIG. 4 is a schematic diagram representative of selective incident permissions that can be granted to various user types.

Referring to FIG. 4 of the drawings, the platform utilises multiple levels of user separation to the extent that the local hosting OS user accounts do not have access within the application, nor can they access sensitive or encrypted data stored in the database in an unencrypted form. Within the IR application there are multiple levels of user accounts stored in various database tables [19] including (but not limited to): Application Administrator [20], Incident Manager [21], Senior Incident User [22], Incident User [23], Executive [24], Incident Team Leader [25] and Incident Power User [26], SOC Manager [27], Contractor [28]. A user can be several of these user types concurrently. The Contractor User [28] is a special user that can be prohibited from downloading files from the system, as this prevents evidence dispersal to non-organisation owned assets. The Incident User [23] type would include; Analysts in the Incident Response team, IT Support staff from the supported networks e.g. server and network administrators and other individuals in the organisation who contribute to the Incident Response process e.g. Legal Advisors, Human Resource (HR) staff, Customer Support staff. The Application Administrator [20] and SOC Manager [27] accounts are able to configure the IR Application [7] to the organisational environment. They are the only accounts able to change the default templates to reflect the localised terms, titles, task names and other values in their IR Application [7]. With the exception of the Application Administrator, these user levels can be tailored per user group or individually according to the requirements of the individual incident.

Figure 5:
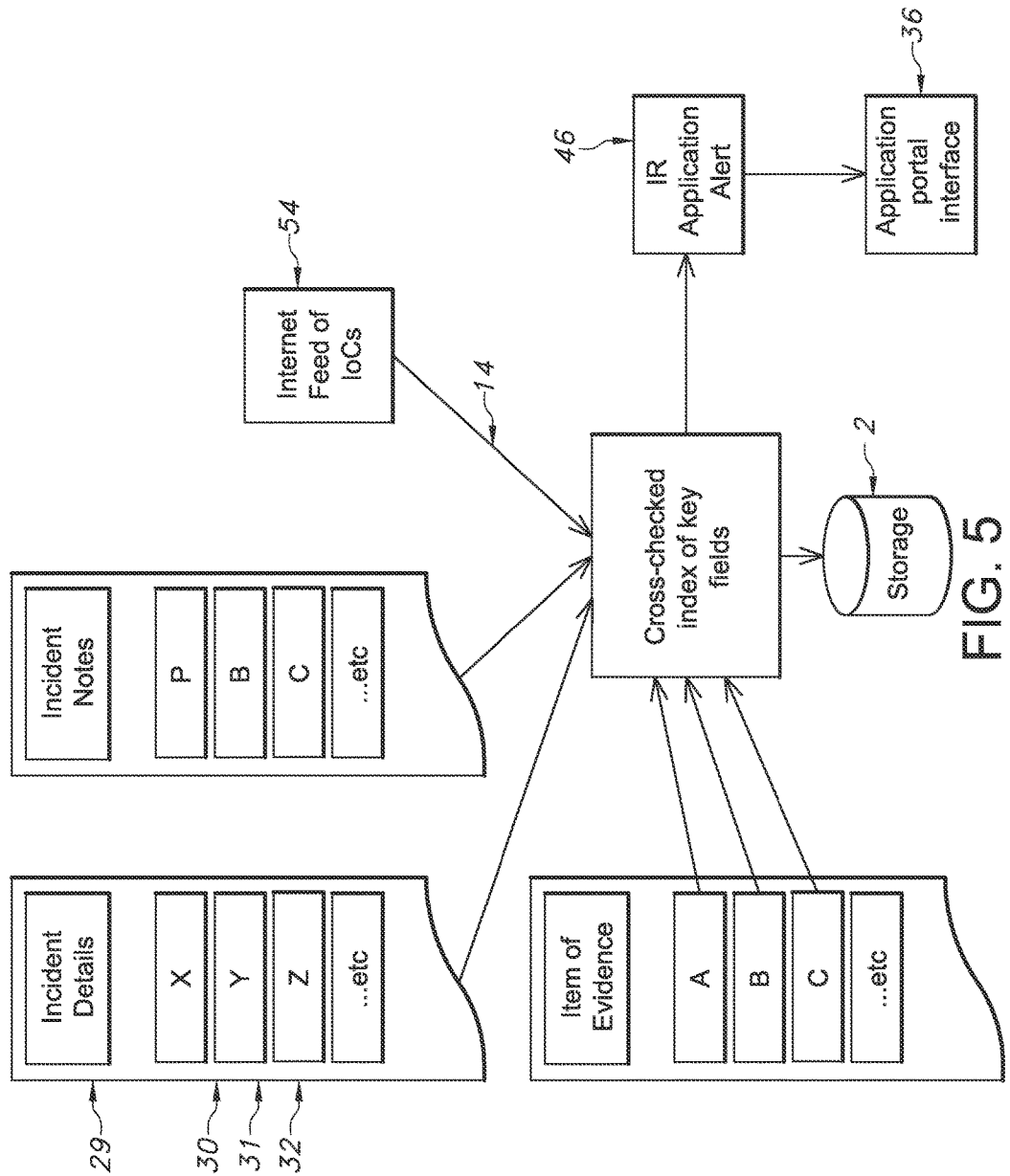
FIG. 5 is a schematic block diagram illustrating the process of incident creation, indexing and storing in an incident response application according to an exemplary embodiment of the present invention.

Incident Creation:

Referring additionally to FIG. 5 of the drawings, when the organisation discovers suspicious activity on their network, or receives a report of either suspicious activity or a successful attack against one of their assets or services, they raise an Incident [29]. An IR application Power-User [26] (or above) can generate a new incident within the IR application, at which point they become that specific incidents Incident Manager [21].

During the generation of a new incident, the Incident Manager [21] is required to supply the known details relating to the incident [29]. The key details of the incident include; targeted IP addresses [30] the targeted operating system(s) [31] and incident impact area [32]. The incident impact area can include (for example): PCI (Payment Card Industry); PII (Personal Identifiable Information), medical, production, development or customer data; however, more fields can be added to the IR Application by the Application Administrator [20]. One of the most important fields added to the Incident is the Incident Priority; this is a high-level and simple assessment of the urgency with which the organisation should tackle the incident. The Incident Manager [21] (or above) can be edited later in the event they are incorrect or they change. The creation of the incident is logged, as is the Incident Creator and the Time of Incident Creation.

Once an incident has been created the Incident Manager [21] will have the ability to add other users (both Internal Users [9] and External Users [13]) to the incident [29]. This is the only way that other users will be able to access the incident's related information.

Figure 9:
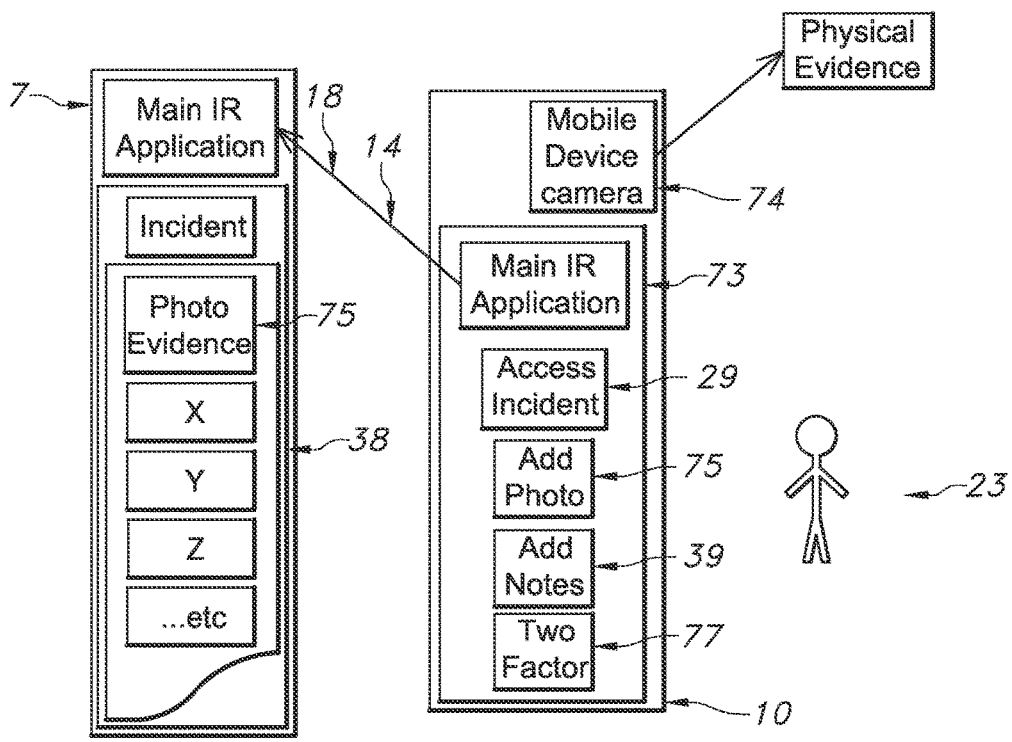
FIG. 9 is a schematic diagram illustrating a companion Mobile IR Application that can be linked to an incident response application according to an exemplary embodiment of the present invention.

Referring to FIG. 9 of the drawings, once added to an incident, Incident Users [23] are able to see it in the IR Application Web Portal Interface [36]. Incident Users [23] are also able to add Entities, that is computer systems; or Evidence [38] to the incident. They are also able to write Incident Comments/Notes [39] about the Incident [29], Entities associated with the Incident [29], Evidence [38] or Incident Events adding their thoughts, views and professional advice. These incident users allocated to that incident can also review the Notes and can add Comments about the notes (allowing them to comment in a less formal manner). Notes can also be flagged as important and thus form part of the Incident, Entity, or Evidence summary.

Adding Objects to Incidents:

Entity objects are systems that are potentially related to the incident (they are described and managed individually). They can be Friendly Entities that is internally or externally hosted systems, all managed by the organisation. Alternatively, they can be Non-Friendly Entities which includes systems the organisation cannot change, control or influence and thus includes suspected attackers and every other system on the Internet. Systems identified as the source of an attack are identified as being Malicious. Networks can also be added as Network Entities, in which case they are identified by their IP address and network mask (for example 10.10.0.1/16), these too can be either Friendly, non-friendly or malicious.

Adding Evidence to Incident Entities

Evidence objects [38] includes any file or data that has been found during the incident. All Evidence must be associated with an Entity. Upon uploading it to the portal, the evidence file is immediately hashed using an industry accepted hashing routine such as SHA256 and then encrypted.

Accessing Uploaded Evidence

After upload, all Incident Users, with suitable permissions to the incident where the file has been uploaded, can access the evidence. All users associated with that Incident will receive an IR Application Alert [46] regarding the upload of the evidence. Incident Users [23] can view a copy of the file in their browser where appropriate, they can download a copy (unless prohibited by the Incident Manager [21]) but they cannot delete the file from the portal. Sensitive Evidence items are those that are deemed by the uploading Incident User or defined by organisational policy as being sensitive or offensive; these cannot be downloaded or rendered if an image from the portal e.g. pornography or child abuse images. These can be extracted later for analysis by Law Enforcement (LE) or Abuse Image Specialists, but not removed or accessed by users or rendered on any IT system by the IR Application.

If an item of evidence was uploaded to the IR Application in error, the Incident User [23] can request that it be hidden from other users, this is can be conducted by either the SOC Manager [27] or the Incident Manager [21]. By default the system will not allow for evidence to be deleted by those within the incident; an Application Administrator will be required to purge it from the system using specialist in-application tools (which log the details of the item removed).

Events are referred to herein as objects, actions or outcomes observed by the team that may be related to an Incident. Events can be initially stored outside specific incidents when they are initially reported to the IR or Security team. When they are determined to be associated with an incident the can allocate it to that incident and at that point it is cloned and appears in that Incident's status page.

During the creation of Entities, Evidence [38] or Events objects, the Incident User's [23] username is logged as an Object Creation Username entry as well as the Object Creation Timestamp. These values are then added to the Incident Activity Timeline automatically. The creating user also gets to set the Object's Priority level of the entity; this is used to communicate to others the importance of this system in relation to others in the Incident [29]. The Object Priority Level does not affect the overall Incident Priority level; thus, a low priority incident can have high priority entities associated with it, indicating what assets need attention first.

Incident Users [23] can add Incident Comments/Notes [39] on any Incident [29], Entity, Event or item of Evidence [38] to which they have access and update or comment permissions.

Indexing and Matching of Evidence to Intelligence:

The IR Application [7] provides the ability for the Incident Managers [21] (and above) and Incident Users [23] to add notes that assisted them in detecting system compromise; these are called Indicators of Compromise or IoCs. These can also be imported from a file or imported from an Internet Feed [54] (using standard secure feed IP based technologies). All the IoC import mechanisms will accept data in a variety of formats including, text files, xml (eXtensible Markup Language). The IoCs imported to the system may include Cryptographic File Hashes of known malware, malicious IP Addresses, malicious Internet Domains and malicious Internet Hosts. Other IoCs that can be imported include Yara signatures (for identifying malware families in system memory and on hard disk images), file locations, and grep/PERL regular search expressions.

The IoCs [54] are both stored in the IR Application [7] and are checked against all new Entities, Evidence [38] objects, Incident Comments/Notes [39] and Incident Events to provide early IR Application Alerts [46] at the time of their creation. The user is warned of an IoC match by means of an Alert [46] that is rendered in the IR Application portal interface [36]. Additionally, upon upload of new IoC, a user can elect to scan their active and archived Incidents for matches against the new IoCs.

Finally, the SOC Manager can schedule IoCs to be checked against all open and optionally closed Incidents on a regular bases. This provides background automation of what was previously a manual and time intensive activity.

Figure 6:
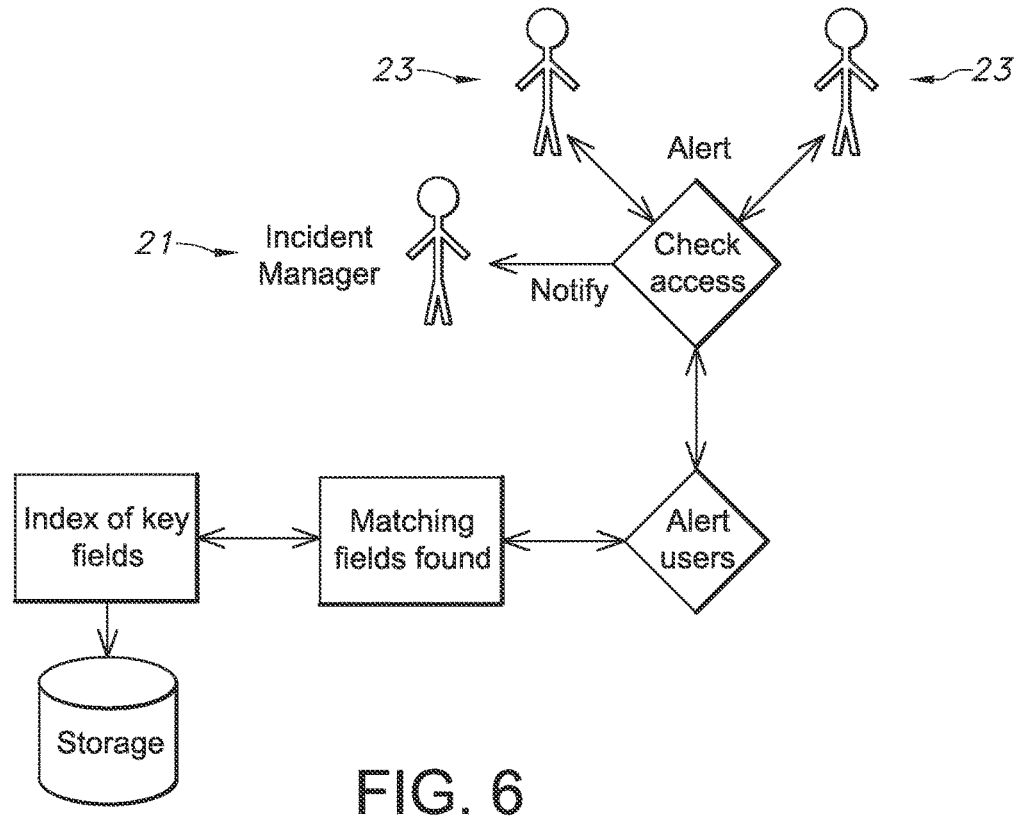
FIG. 6 is a schematic diagram representative of the manner in which an incident response platform according to an exemplary embodiment of the present invention detects a match of data relating to two Incidents and alerts all Incident Users with permission to access both Incidents.
Figure 7:
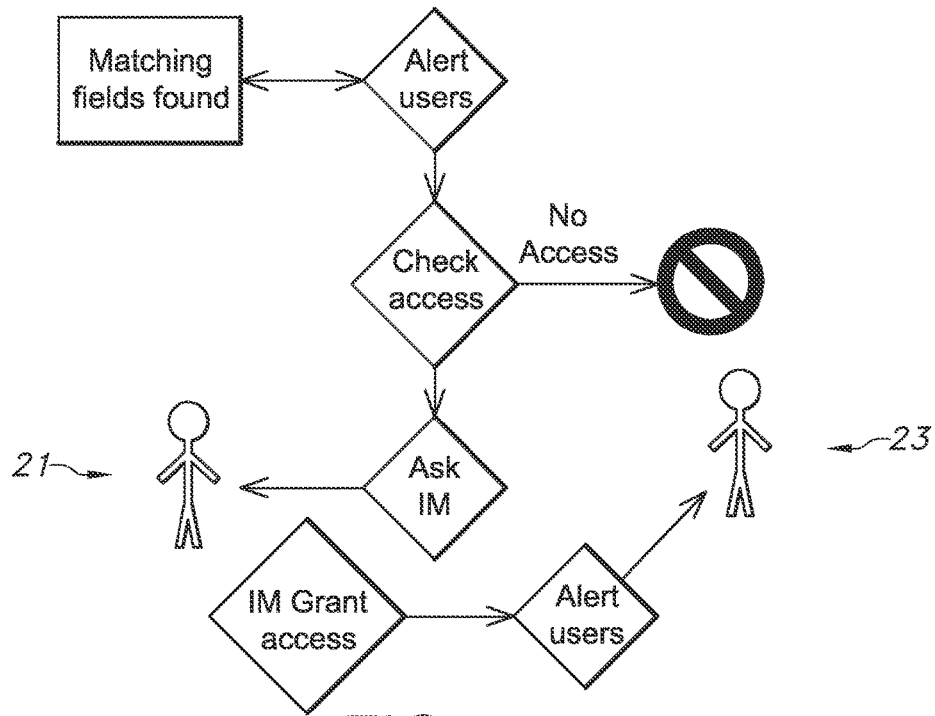
FIG. 7 is a schematic flow diagram representative of a process for allowing a user access to an old incident, by means of a request to the incident manager.

Referring to FIGS. 6 and 7 of the drawings, in order to protect the 'Need to know' concept of the IR Application data, when the IR Application [7] detects a match of data relating to two Incidents [29] it will alert all Incident Users [23] with permission to access both Incidents. When the user does not have access to one of the Incidents, the IR Application will alert the Incident Manager [21] of the Incident the user has no access to. This will enable the Incident Manager to decide if they want to allow the Incident User [23] access to the Incident. This prevents User speculatively adding data to fields of evidence to see if it matches already resident data.

Workflows for Incident Management

Figure 8:
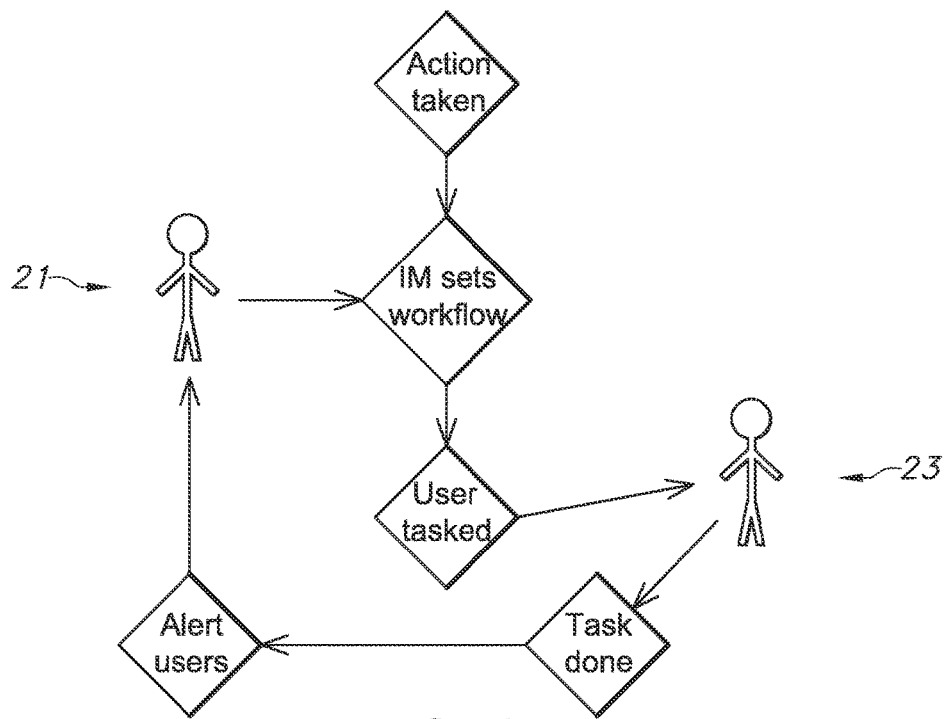
FIG. 8 is a schematic flow diagram illustrative of the workflows for incident management used within a system according to an exemplary embodiment of the present invention.

Referring now to FIG. 8 of the drawings, in order to manage the incident, and ensure that appropriate steps are taken at both management and technical levels, Incident Managers [21] can associate an Incident User [23] with an Entity, Evidence [38] or Event and a specific Workflow that they should follow.

Workflows are stored in a part of the IR Application [7] and they can be uploaded, edited and deleted. The SOC Manager [27] controls access to the Workflows Repository that standardise the Incident Response processes that the Incident Users in that SOC follow. Workflows can be derived from National and International Law, Regulatory requirements, Organisational requirements, Industry Best Practice, or SOC Staff agreed methods.

When an Incident [29] requires some Workflow directed activity, the Incident Manager [21] or Incident User allocates the necessary Workflow to an Evidence or Entity object. The Workflow is copied from the Workflow Repository at the time of allocation and bound to the analysis object. This prevents updates to central Workflow Repository from altering the work an analyst has to conduct (this is important when Incidents are archived and re-opened for re-analysis or legal case preparation).

Workflows are broken down into Workflow Steps and Workflow Milestones. Each Workflow step will have details of; system commands to run, input requirements, personnel to contact, information expected to be exchanged with users outside the Incident as well as the expected output from the step. These standardised steps have Workflow Time Estimate requirements allocated to them. Several Workflow steps make up a Workflow Milestone. During the Incident Response process, Incident Users update their Workflow status in the IR Application. Steps are not reported outside the User's own console (the steps serve as a local task list), however, Workflow Milestone completion is reported to the Incident Manager [21] and the status of the items associated with the Workflow (the Entity, Evidence, or Event) is updated on the associated status page. The time the User started the Workflow, the times of the various Workflow Milestones being completed, the hours expended and Incident User Notes [39] are all recorded against that Workflow. This facilitates Workflow review and analysis by the Incident Manager [21] and the SOC Manager [27].

Workflow: Analyst Skill Requirements

Each individual Workflow has a list of Workflow Requirements; skills, qualifications and certifications that are pertinent for its successful completion. Some of these are optional but some are mandatory e.g. Forensic skills are required for a deep dive forensic analysis of a system. Each Incident User [23] has a Skills and Qualifications Matrix that they maintain in consultation with the SOC Manager [27]. During the Incident Management process the Incident Manager [21] can check that the Incident User [23] has the necessary skills to complete the Workflow before it is allocated to them. Additionally, when initiating the Workflow on an object the IR Application will check the Workflow Requirements against the User Skills and Qualifications Matrix and it will suggest which Incident Users [23] are best placed to complete this task.

Workflow: Workload Management

The Incident Manger [21] can also check what Workflows the Incident User has already been allocated. This enables the Incident Manager [21] and the SOC Manager [27] to better manage their staff, ensuring that individuals are not overloaded, and spreading the workload and using their skills to maximum effect. Additionally, the Incident Manager [21] can see the priority of the other Workflows (derived from the Incident Priority) and can estimate when the Incident User would be able to complete the soon to be allocated Workflow. This is a crucial aspect of team management that is difficult when Incident Response staff are not co-located.

If the Incident Manager is not able to find the necessary skills within that Incident's Incident Users or their current Incident Team, they can search the list of Application Users for the necessary entries in their User Skills and Qualifications Matrix [56]. They can also obtain an indication of the matching Incident User's workload and prioritisation. The Incident Users workload is sanitised when presented to the Incident Manager preventing the Incident Manager from seeing Workflows allocated to an Incident User working on an Incident the Incident Manger is not allocated to.

If the Incident Manager finds a suitable candidate they can work with the SOC Manager [27], and with their approval, can add that Incident User [23] to the Incident Managers [21] current Incident [29], before allocating the Workflow [56] to the newly allocated Incident User [23].

If the Incident Manager [21] is content with the Incident Users capability to complete the Workflow (and that they have the capability to complete it in the necessary time period) the Incident Manager makes the allocation, adding the priority for the Workflow and the requested timeframe for completion. The User is alerted to the allocation via an IR Application Alert [46] and the Workflow is also added to the Incident Users task list, within the IR Application. The status page of the subject of the Workflow (e.g. Entity, Evidence [38] or Event) is annotated with the details of the Workflow, the Incident User [23] assigned the Workflow and both the requested time for completion and the Workflows estimated time requirements.

As the Incident User works through an allocated Workflow they update the system when they pass a Workflow Milestone. This updates the Incident Manager [21] and the status page of the subject of the Workflow (e.g. Entity, Evidence [38] or Event), so that everyone on the Incident can see what progress has been made and when. Additionally, the IR Application will detail the Workflow derived time to next milestone and estimated time for the Workflow to be completed entirely.

Workflows can also be chained so that IR steps are conducted in the correct order. For example a system needs to be imaged before the image can be analysed.

Workflow: Time and Cost Analysis

If an organisation makes regular use of the Workflows, the SOC Manager [27] can review the delta from the forecast time for Workflow Milestones to be completed and the actual time to complete by various Incident Users [23] and Incident Power Users [26] (the highly technical analysts) and Senior Incident Users [22] (the highly experienced analysts). This allows the SOC Manager to adjust the time allocated to the Workflow (up or down), or to modify the Workflow's steps, or place a note in the Workflow that analyst X is faster/better/more thorough than analyst Y, so analyst X should be used where workload permits.

Additionally, a SOC Manager [27] in consultation with the Executives [24] and Incident Manager [21] can decide if the Workflow is a good use of their limited resources. They are supported by the IR Application [7] as it can assess the Workflow Cost Estimate [64]; this is a multiple of the allocated Incident User's [23] hourly rate and the number of hours required to complete the workflow. This enables an organisation to assess the potential cost of deep dive forensic investigations before it commences.

Virtual Operating Systems for Analysis of Evidence

Figure 10:
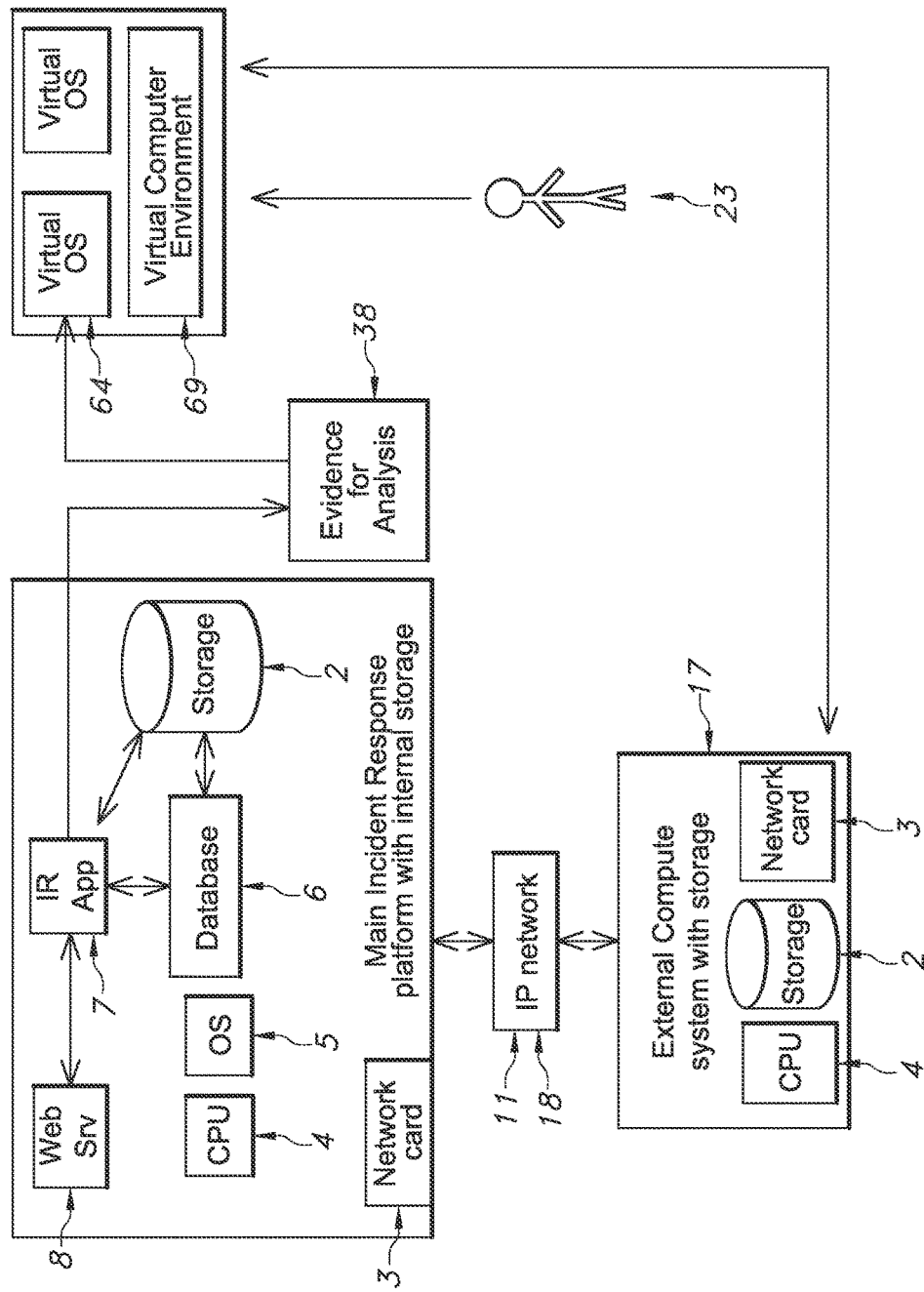
FIG. 10 is a schematic block diagram illustrating the use of Virtual Operating Systems for analysis of evidence.

Additional reference will now be made to FIG. 10 of the drawings. Virtualisation of Operating Systems has been used for Incident Response for many years in two forms; sandboxed Virtual Machines (VMs)[64] and hosted Analysis systems. Sandboxed VMs are used in automated Malware analysis to observe malware executing and to identify artefacts of execution (files created, memory images, IP address connected to, domains looked up, IP ports listened to and the names of services started). Hosted Analysis systems are used by analysts to work on dangerous files, conduct searches, and examine items of evidence.

However, the sandboxed execution is not available for analysts to interact with and the running of VMs on local analysts' systems can result in evidence dispersal. Therefore, both of these are sub-optimal to dynamic but secure IR activities. To improve this, the IR Application [9] will have a Virtual Machine Hosting Environment [69] built in. This will allow an Incident User [23] to select items of Evidence [38] and request the IR Application build a Virtual Machine [64] with these items imported to that VM. The IR application will request various details from the Incident User [23] regarding the connectivity of the VM, the OS type of the VM, the system the Incident User wants to connect to the VM from and the persistence type of the VM. The Incident Users [23] connectivity options include; Internet connected (through obfuscation networks), a connection to a 'fake and monitored internet' (a type of honeynet), connected to a currently running IR Application VM (so two or more systems can interact) and IP Isolated (no connectivity). The VM OS type options include all current enterprise and mobile platforms capable of being virtualised. These VMs can be basic clean installations or they may have been modified by the organisation to include Incident Response tool kits to support their activities and Workflows. The persistence aspect of the VM is to allow the IR Application [9] understand its future CPU and storage load requirements. Some VMs may only be required for a few minutes (e.g. for malware examinations) however, some may be used for the entire Incident (possibly days or weeks). This ensures the IR Application is not over committed in terms of CPU, storage and RAM.

Figure 11:
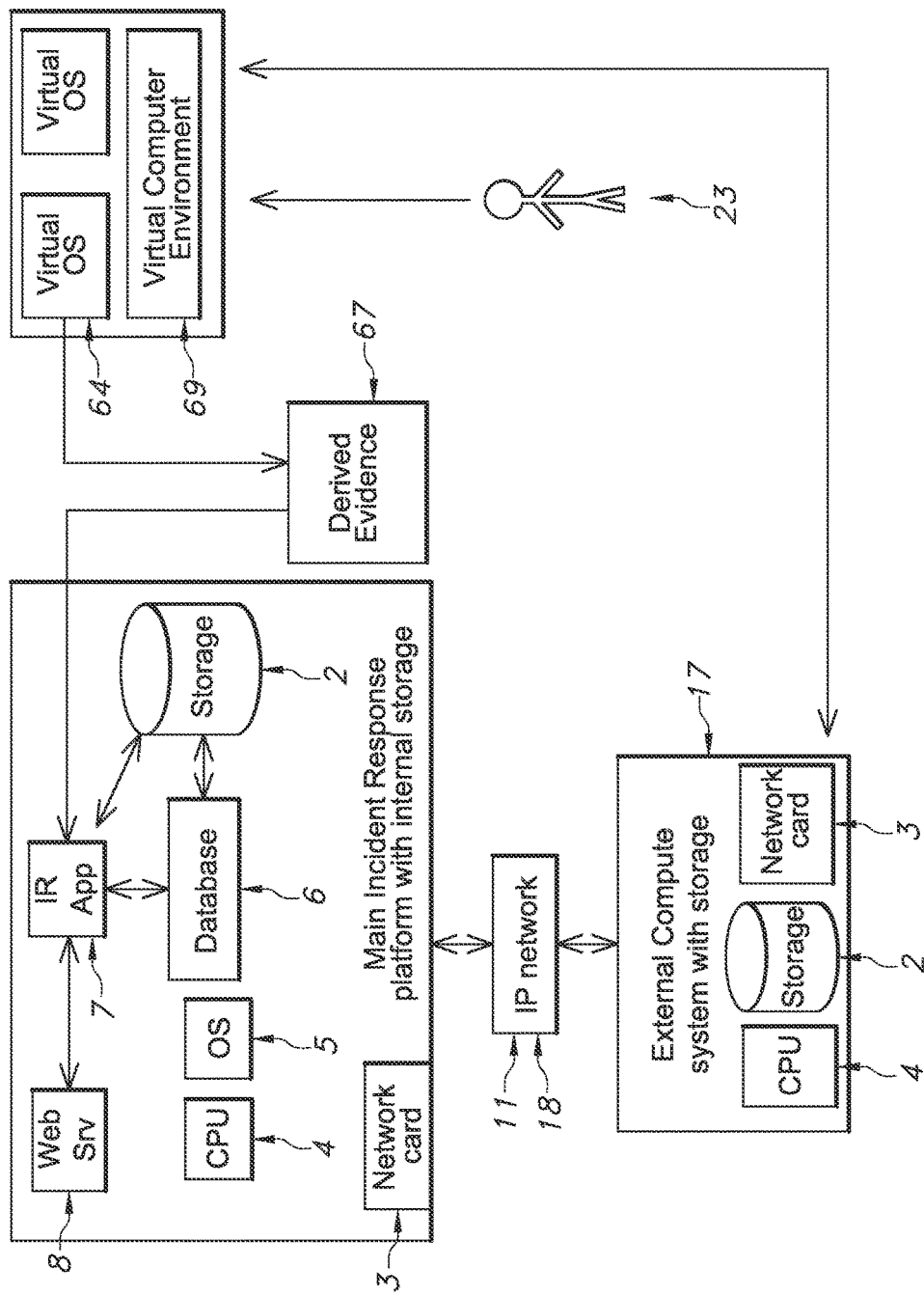
FIG. 11 is a schematic block diagram illustrating the use of Virtual Operating Systems for managing, tracking and analysis of derived evidence.

Once the VM has been generated, either within the IR Application's own platform [1] or an external Compute module [17], the IR Application would import the Incident User's [23] selected items of Evidence [38] and would send the user an IR Application Alert [46] when the system is available for use. This would include the connection details and the Secure Logon Credentials. The Incident User is then able to connect to the system using Secure IP Connectivity [18] and interact with the system. While using the VM, the Incident User can send processed evidence to the IR application for other users assigned to that incident to see, review and comment upon. The Incident User can also send new items of Evidence from the Incident to a currently running VM. Referring to FIG. 11 of the drawings, the IR Application will automatically associate the output of the Incident Users analysis of the Evidence [38], called Derived Evidence [67] with the Incident that the VM was generated in support of. The IR Application will automatically associate all Derived Evidence [67] with the user of the VM.

When the Incident User is finished with the VM they can return to the IR Application and request its disposal. At this point the IR Application will recover all final items of Derived Evidence [67] and in the case of the VM being used in a Monitored Network, the packet capture associated with the VM and upload it to the Incident [29] as Derived Evidence [67]. If the system was Linux/Unix, the IR Application will also export the command history (e.g. the BASH History) as Derived Evidence [67] so that the user/incident manager or legal auditor can check what actions they performed in the VM and thus validate the evidence handling procedure used and the integrity of evidence. The IR Application will then ask the Incident User to supply further details and Notes [39] on this new Derived Evidence [67]. This removes the requirement for users to download Evidence to their system be they Internal Users [9], External Users [13] or Contractors [28] and ensuring that all Incident Users [23] with access to that Incident [29] have access to the latest Evidence [38], Derived Evidence [67] and Incident User Comments.

Timeline Generation, Forecasting and Reporting

Throughout the handling of the Incident Response process, the actions of the various users are recorded and time stamped. This enables an Incident Response Activity Timeline to be generated and rendered in the IR Application Web Portal Interface [36]. This gives visibility to Executives [24] as to the progress of the Incident. Furthermore, the use of Workflows with their associated estimated time to completion, enables the IR Application to forecast when an Incident will be concluded. Finally, if Estimated Costs [69] have been added to the Workflows, a realistic cost for dealing with the Incident can also be forecast. This gives executives the ability to change the planned Incident Response activities if they believe the costs outweigh the current benefits, examples of this include the deep forensic analysis of a system infected with generic malware.

As the Incident Users [23] are dealing with their incidents, they are adding Incident User Comments, Evidence [38] and Event objects with various time stamps embedded. Furthermore, they are able to add significant times, dates and Incident (not investigation) timeline relevant data that will enable the IR Application to automatically generate a skeleton Incident Timeline. This outlines when the attack started, against what system and what was compromised, it continues to map out the lateral movement conducted by the attackers as derived from the Incident User Comments and identified Incident Key Events. This timeline can be exported in a variety of file formats or rendered in the IR Application Web Portal Interface [36]. The Incident User is able to augment this Incident Timeline by flagging data in the Incident Workspace.

Secure Upload of Evidence

During an Incident evidence often resides on compromised systems but copying data from these systems to other clean system for upload to the IR Application would result in evidence dispersal. Conversely, accessing the IR Application from a potentially compromised host could result in IR Application credentials being disclosed to attackers.

The IR Application prevents this in two ways. Firstly, Incident Users cannot log on to the Application from an IP address listed as compromised in any of the active Incidents. Secondly, the IR Application can be requested to provide a dynamically created upload location where files can be placed for import. This is conducted through the IR Application Web Portal, where an Incident User requests an upload Drop Folder [72] to be opened on the IR Platform. The IR Application requests the Incident User identifies; the Incident that the uploaded files should be associated with, the IP address that the connection will be made from, the duration the Drop Folder should be open for and the type of mechanism to be used (e.g. Secure copy via SSH (Secure SHell). The IR Application then generates a one-time user logon and password for the Drop Folder and makes suitable changes to its own local firewall to enable access to the folder.

The Incident User is then able to upload evidence from a potentially compromised host without worrying about IR Application credentials being compromised. Once uploaded the files are subject to normal Evidence upload processes. Once completed the Incident User can either request the IR Application close off the Drop Folder or wait for it to expire. Incident Users can be limited in the number of Drop Folders open at any one time and this is configurable by the Application Administrator.

Upload of Offensive Images

The Drop Folder process will support the upload of offensive images via the command line without the user observing any graphical rendering of the images. Once uploaded to the IR Application, image files are not rendered graphically at any point until they are confirmed as not relating to offensive content.

Mobile Application

Referring back additionally to FIG. 9 of the drawings, a companion Mobile IR Application [73] that is linked to the IR Application will extend the Incident Users ability to import images to the IR Application. The mobile IR Application is paired to the IR Application by a cryptographic key. The mobile IR Application will enable the Incident User [23] to review some items of evidence (that will render in a browser), comment on Evidence [38], Events and Incident Comments/Notes [39] as well as engage in secure chat and voice communications with other IR Application users. Mobile IR Application [73] users will also be able to view workflows and timelines of activity (where screen resolution permits), enabling them to stay aware of developments in the Incidents they are involved with; or in the case of Executives, it will show them the incidents that they are supporting or directing and the current status of the response effort.

This is particularly useful when the Incident User wishes to, using the mobile device's built-in camera [74] add photographic evidence [75] of systems, documents, server rooms and people etc. The mobile IR Application [73] is linked to the IR Application [7] by means of IP network connectivity [11] using secure IP protocols [18].

Two Factor Authentication Using Mobile App

The mobile IR Application will have the ability to generate one time codes that change every one to two minutes (configurable). These codes will be derived from cryptographic functions and will be known only to the IR Application [7] and the linked Mobile IR Application [73]. This can be used to prove the Application User is who they claim to be. As this is in addition to the User account's password, it is deemed Two Factor Authentication 2FA. Users will link their mobile device in their profile to enable the 2FA authentication [77].

Logging Mechanism

All log entries created by the system have a unique hash associated with them which is derived from the contents and meta-data of the previous log as well as their own contents and meta-data. These are then processed by a complex computational algorithm that makes use of installation specific information held outside of the database. These hashes are recomputed and validated by the system at regular intervals and by specific events. In the event of the database being tampered with, an alert is generated for the incident manager and application administrator and a tamper flag is assigned to the log entry. This allows incident managers to continuously monitor and prove the integrity of log entries and act accordingly in the event of a compromise. The entire log associated with an incident can be exported as a PDF (which is also stored and hashed using the secure encryption mechanisms derived from the secure upload facility of the application) and printed to provide a hard copy that can be signed and stored securely and used to supplement incident response activities.

Automated Analysis of Malware and Derived Evidence Creation

The IR Application will be able to utilize the VM environment, providing the facility for the monitored execution of malicious files (known as sandbox malware analysis). The Incident User will select a suspect executable file or a zip file containing a suspicious executable. They will request the IR Application conduct dynamic analysis, whereupon the IR Application will generate a dynamic malware analysis Virtual Machine based upon a template version it holds. The IR Application will start the analysis VM and will monitor all changes to the system (files created and configuration changes made) and network traffic generated from just before the execution of the suspicious file and the termination of the VM (a determined period of time after execution of the suspicious file). The IR Application will then generate a report for the detailing all detected changes. It will save the network capture in a standard capture format. This report and capture file will be uploaded as Evidence object to the Incident that the suspicious file came from. The IR Application will mark these Evidence objects as system generated and Derived Evidence. The VM will be destroyed after use.

Enterprise Deployments

When operating in multiple locations, the IR Application will use secure network protocols (ssh or similar) to synchronise with other instances. These linked systems will synchronise user accounts, active incidents and the objects associated with Incidents (Events, Comments and Evidence) up to an IR Application Administrator specified file size. Regardless of location, Incidents are only visible if the IR Application user has been added to that Incidents, User Group. This allows teams in different locations to access, use and collaborate on the same incidents as if they were on the same system. To minimise network bandwidth and reduce duplication of data storage usage, when identifying users to work on full image analysis, the IR Application will inform the Incident Manager which users are closest to the drive images.

Collection Agent

To speed up evidence collection from compromised systems, when an Incident User has added an IP address to the Incident and associated the initial evidence recovery workflow to the system, the IR Application will generate an Evidence Harvesting executable. Then when an administrator or root level user logs onto the compromised system and points their web browser at the IP Address of the IR Application, instead of seeing an authentication screen, they are offered the Evidence Harvesting executable for download. They then run the executable with sufficient privileges, which will automatically commence the secure upload of evidence to the specific incident using the Drop Folder mechanism.

Entity Tagging

The IR application [7] will support the tagging of objects such as incidents, entities and evidence. These tags are comprised of plaintext and will form meaningful links between their associated objects. Each tag will have it's own page within the IR Application [7] containing which will act as a centralised repository of facts relating to the tag. examples of this include the tagging of multiple incidents with a tag indicating an associated campaign, or tagging an executable with an indicator which defines the associated malware family. Multiple tags can be assigned to objects of varying or identical types.

Having outlined an exemplary embodiment of the invention, the following provides a summary of key and optional features, that may be included:

In general, embodiments of the present invention provide computer based and network connected system with web, database, storage, processing, display rendering and application logic technologies that enables technical and managerial orientated individuals to conduct technical analysis, report progress, communicate, manage and plan response strategies for cyber and information security incidents;

external compute and storage systems may be employed to enhance the process and storage capabilities of the primary system;

the system may be further protected by user authentication, user permissions and user activity logging that is separate from the network and system that hosts the application.

exemplary embodiments of the invention also provide a method of controlling users access to individual incidents so that they are not able to view any aspect of an incident they are not required to support or whose incident support team they are not a member of.

Thus, a method of incident management may be provided which comprises the following:

a. users identifying entities (system of interest) to the incident and entering data about those systems into the application that stores that data in an encrypted database.

b. users assigning priority to incidents based upon the impact to the business or organisation. The application rendering the incidents in priority order to ensure the highest priority systems are dealt with first.

c. users communicating about the incident entities via the application in a manner that is secure and time-stamped with the users unique identifier.

d. users uploading items of evidence related to their incidents to the system by means of web file upload technologies or various file transfer protocols from any server, desktop system, tablet or mobile device within network range.

e. The application conducting file type analysis of the uploaded data and performing analytical functions on the file dependent on the file type.

f. The application conducting basic static analysis activities on the files uploaded.

g. The application conducting enhanced dynamic analysis of executable code and files suspected of being malicious as requested by the user (manually or as part of an elective automated process).

h. Providing the user the ability to expand compressed files and extract files from network traffic captures and raw data (disk or memory) extractions and to make these extractions visible in the main application interface.

i. Providing the incident manager and application administrator with the ability to prove the integrity of the entire IR process via a secure logging mechanism.

a system according to an exemplary embodiment of the invention may further comprise the ability for the system to make, host and support various Virtual Machine Environments and to provide access to those for the purpose of analysing evidence associated with incidents. Additionally the system may:

j. provide the user with the ability to add selected evidence items to an application generated VME, to allow the user to customise that VME before it is created and for the application to provide the user with authentication and interface details to allow them to interact with the VME.

k. provide the user with the ability to request the application monitors all network communication from the VME and to make that capture available in the application interface for further analysis.

l. provide the user the ability to customise the VME to their forensics and analytical needs.

m. provide the user the ability to extract all data generated in the VME as a result of their analysis of the evidence the application imported to the VME and to provide that derived evidence in the main application interface.

n. provide the user the ability to extract records of their activity in the VME and to provide that as evidence in the main interface.

o. securely destroy the VME after the user has confirmed they no longer require it or any data held within it.

exemplary embodiments of the system may be further enhanced by the use of workflows that outline a merger of the industry best practices, legal requirements pertinent to the organisation and the organisation's own procedures and processes.

exemplary embodiments of the system may be further enhanced by the incorporation of the workflows into the user interface. This may comprise:

p. the appropriate workflow being assigned by the system or Incident Manager to the user and the user receiving notification of the workflow and associated details of process and time allocated to the workflow.

q. the user updating the system when they have completed the milestone objectives of the workflow.

r. the application updating the other users in the incident and the Incident Managers of the progress being made by all users on all workflows associated with the incident.

s. the application linking the workflow to the entity and evidence at the time of tasking, so updated workflows are not applied to closed incidents, completed workflows or workflows in progress.

an exemplary embodiment of the system may be further enhanced by the analysis of previous workflow activity and the time to complete the workflow.

an exemplary embodiment of the system may be further enhanced by automated hashing, encryption and indexing of data entered or uploaded by users by adding it to a master index and the exploitation of this data by:

t. the cross checking all new incident data against the master index and alerting users and incident managers of identified managers of any match or near match (by means of fuzzy logic).

u. the alerting of incident managers when their incidents have matches in the master index for incidents but the other user does not have access to the incident managers incident; preventing users fishing for data and maintaining the principal of need-to-know on incident data.

v. augmenting the master index by means of other local or remote sources or feeds of known malicious or suspicious items including but not limited to suspected or malicious; IP addresses; Autonomous System numbers; registry keys, regular cryptographic and Context Triggered Piecewise Hashing (CTPH) hashes an exemplary embodiment of the system may be further enhanced by the ability for the IR Application to dynamically open its firewall and configure file transfer services to receive data from compromised hosts in a way that:

w. does not expose the IR Application or IR Platform system to undue risk as the Incident User defines exactly what source IP address can connect to the system, the time window of access and the communication protocols.

x. does not place Incident User credentials at risk by the use of IR Application dynamically generated one-time or limited-use access credentials that permit access to only the drop folder locations that the Incident User requested.

An exemplary embodiment of the system may be further enhanced by the use of a linked mobile device based application that enables the user to:

y. upload photographs from the device and taken by the built-in camera directly to the IR Application and specific Incidents that the user has access to.

z. communicate with other IR Application users both directly and through the commenting process, enabling the user to remain up-to-date on aspects of their Incidents.

aa. receive alerts from the IR Application about background automated analysis that it was conducting at the request of the user.

bb. receive alerts from the IR Application about cross matches of evidence, events and comments with new intelligence feed related information, enabling the Incident User to be advised about new information that could be pertinent to their Incident and investigation.

cc. maintain an awareness of progress on various Incidents by viewing progress charts, timelines and other visual representations of the activities of the team's work in the IR Application.

Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of embodiments, even if the other features and embodiments make no mention of the particular feature. Thus, the invention extends to such specific combinations not already described.

Still further, it will be apparent to a person skilled in the art from the foregoing description, that modifications and variations can be made to the described embodiments without departing from the scope of the invention, as claimed.

The invention claimed is:

1. A computer-implemented incident response management system, comprising:
   an incident response application providing a user interface;
   at least one central processing unit;
   an operating system;
   a database communicably coupled to said incident response application;

wherein said incident response application is configured to:

create an Incident Record in response to receiving from a first user, via said user interface, notification of a cyber or information security incident, together with data objects representative of entities related to said incident, files and/or data found during said incident, and/or observed actions and/or outcomes related to said incident, and store said Incident Record including said data objects;

receive, from said first user via said user interface, data representative of one or more selected users authorised to access said Incident Record;

provide via said user interface, only upon request from one of said selected users, an interactive representation of said Incident Record, including information represented by said data objects, to selected users;

receive, only from said first user or a said selected user, via said user interface, further data objects related to said cyber or information security incident and representative of entities related to said incident, files and/or data found during said incident, and/or observed actions and/or outcomes related to said incident; and add said further data objects to said Incident Record;

in response to creation of said Incident Record or addition a further data object to said Incident Record, compare said data objects of said Incident Record with a stored record of Indicators of Compromise, generate an alert if a matched Indicator of Compromise is detected, and store data representative of said matched Indicator of Compromise in said Incident Record.

2. A system according to claim 1, wherein said incident response application is configured to generate said stored record of Indicators of Compromise by receiving Indicators of Compromise as one or more user inputs and/or as imported files or internet feeds, and storing said received Indicators of Compromise.

3. A system according to claim 1, configured to allow a user to schedule periodic comparisons of Indicators of Compromise against data objects stored in connection with a plurality of stored Incident Records, and generate an alert in the event that a match is identified.

4. A system according to claim 1, configured to associate one or more of said data objects with one or more selected users, and generate or retrieve and output a workflow in relation to said one or more data objects for performance by said one or more users.

5. A system according to claim 3, wherein said workflow includes an indication of timescales within which steps of said workflow should be performed, and a function for recording the times at which said steps are performed.

6. A system according to claim 3, wherein said workflow includes an indication of the required characteristics of the user to perform the steps thereof.

7. A system according to claim 1, comprising a virtual machine hosting environment configured to generate a virtual machine based on selected data objects of an incident, provide a user interface for said virtual machine for enabling a user to interact therewith, generate evidence data representative of outcomes resulting from user interaction with said virtual machine, and storing said evidence data in connection with said incident.

8. A system according to claim 1, configured to allow an Incident Record to be accessed only from authorised IP addresses.

9. A system according to claim 4, including a reporting function for generating a report including data related to said incident, data relating to workflow steps planned and performed, projected workflow timescales, and any additional user-generated data relevant to said incident.

10. A method of providing an incident response management system, the system comprising:

an incident response application providing a user interface;

at least one central processing unit;

an operating system;

a database communicably coupled to said incident response application;

the method comprising configuring said incident response application to:

create an Incident Record in response to receiving from a first user, via said user interface, notification of a cyber or information security incident, together with data objects representative of entities related to said incident, files and/or data found during said incident, and/or observed actions and/or outcomes related to said incident; and store said Incident Record including said data objects;

receive, from said first user via said user interface, data representative of one or more selected users authorised to access said Incident Record provide via said user interface, only upon request from one of said selected users, an interactive representation of said Incident Record, including information represented by said data objects, to selected users;

receive, only from said first user or a said selected user, via said user interface, further data objects related to said cyber or information security incident and representative of entities related to said incident, files and/or data found during said incident, and/or observed actions and/or outcomes related to said incident; and add said further data objects to said Incident Record;

in response to creation of said Incident Record or addition a further data object to said Incident Record, compare said data objects of said Incident Record with a stored record of Indicators of Compromise, generate an alert if a matched Indicator of Compromise is detected, and store data representative of said matched Indicator of Compromise in said Incident Record.

11. A method according to claim 10, including the step of configuring said incident response application to create and store a record of Indicators of Compromise by receiving said Indicators of Compromise as one or more user inputs and/or as imported files or internet feeds.

12. A method according to claim 10, including the step of configuring the system to allow a user to schedule periodic comparisons of Indicators of Compromise against data objects stored in connection with a plurality of stored Incident Records, and generate an alert in the event that a match is identified.

13. A method according to claim 10, including the step of configuring the system to associate one or more of said data objects with one or more selected users, and generate or retrieve and output a workflow in relation to said one or more data objects for performance by said one or more users.

14. A method according to claim 13, wherein said workflow includes an indication of timescales within which steps of said workflow should be performed, and a function for recording the times at which said steps are performed.

15. A method according to claim 13, wherein said workflow includes an indication of the required characteristics of the user to perform the steps thereof.

16. A method according to claim 10, wherein said incident response management system comprises a virtual machine hosting environment, and the method includes the steps of configuring said virtual machine hosting environment to generate a virtual machine based on selected data objects of an Incident Record, provide a user interface for said virtual machine for enabling a user to interact therewith, generate evidence data representative of outcomes resulting from user interaction with said virtual machine, and storing said evidence data in connection with said incident.

17. A method according to claim 10, including the step of configuring the system to allow an Incident Record to be accessed only from authorised IP addresses.

18. A method according to claim 14, including configuring a reporting function for generating a report including data related to said incident, data relating to workflow steps planned and performed, projected workflow timescales, and any additional user-generated data relevant to said incident.

* * * * *